United States Patent
Alley et al.

(10) Patent No.: US 9,539,618 B2
(45) Date of Patent: Jan. 10, 2017

(54) SYSTEM AND METHOD FOR PRESENTATION OF EARS OF CORN FOR IMAGE ACQUISITION AND EVALUATION

(75) Inventors: Scott E. Alley, Slater, IA (US); Neil J. Hausmann, Davis, CA (US); Craig R. Homan, Grimes, IA (US); Jason J. Kelsick, Alleman, IA (US); Michelle L. Parlett, Clive, IA (US)

(73) Assignee: PIONEER HI-BRED INTERNATIONAL, INC. IA (US)

( * ) Notice: Subject to any disclaimer, the term of this patent is extended or adjusted under 35 U.S.C. 154(b) by 485 days.

(21) Appl. No.: 13/367,402

(22) Filed: Feb. 7, 2012

(65) Prior Publication Data
US 2012/0260618 A1 Oct. 18, 2012

Related U.S. Application Data

(60) Provisional application No. 61/475,462, filed on Apr. 14, 2011.

(51) Int. Cl.
*H04N 7/18* (2006.01)
*B07C 5/02* (2006.01)
*A01D 45/02* (2006.01)

(52) U.S. Cl.
CPC ............... *B07C 5/02* (2013.01); *A01D 45/02* (2013.01); *B07C 2501/009* (2013.01)

(58) Field of Classification Search
CPC ..... A01D 45/02; B07C 2501/009; B07C 5/02; H04N 7/18

(Continued)

(56) References Cited

U.S. PATENT DOCUMENTS 4,150,743 A * 4/1979 Lazzarotti ................. B07C 1/04
198/444
4,308,959 A 1/1982 Hoover et al.
(Continued)

FOREIGN PATENT DOCUMENTS

CN 101881598 A 6/2010
CN 201010210313 A 6/2010
(Continued)

OTHER PUBLICATIONS

PCT/US2012/024058 International Search Report and Written Opinion.
(Continued)

*Primary Examiner* — Dave Czekaj
*Assistant Examiner* — Berteau Joisil
(74) *Attorney, Agent, or Firm* — Pioneer Hi-Bred Int'l, Inc.

(57) ABSTRACT

A system for automated high throughput presentation of an ear of corn for image acquisition and evaluation is provided. The ear evaluation system may include an image acquisition system for acquiring an image of the ear of corn. An ear staging system may be configured for coordinating timing and movement of the ear of corn through the image acquisition system. The ear evaluation system may define a mobile structure. Thereby the mobile structure may be driven or towed over rows of corn in order to acquire images of the corn substantially simultaneously with picking the ears of corn. Accordingly, image data relating to ears of corn may be obtained in a rapid manner. A method for high throughput presentation of a plurality of ears of corn for image acquisition and evaluation is also provided.

24 Claims, 9 Drawing Sheets

(58) Field of Classification Search
USPC .......................................................... 348/89
See application file for complete search history.

(56) References Cited

U.S. PATENT DOCUMENTS

| | | | |
|---|---|---|---|
| 4,436,207 A | 3/1984 | Klukis | |
| 4,818,380 A | 4/1989 | Azegami et al. | |
| 5,197,585 A * | 3/1993 | Blood | B65G 47/52 |
| | | | 198/384 |
| 5,238,121 A | 8/1993 | Frisbie | |
| 5,518,454 A | 5/1996 | Twilley et al. | |
| 5,659,623 A | 8/1997 | Conrad | |
| 5,751,421 A | 5/1998 | Wright et al. | |
| 5,764,819 A | 6/1998 | Orr et al. | |
| 5,835,206 A | 11/1998 | Tragesser | |
| 5,839,954 A * | 11/1998 | Schloesser | A01D 45/02 |
| | | | 460/119 |
| 5,991,025 A | 11/1999 | Wright et al. | |
| 6,212,824 B1 | 4/2001 | Orr et al. | |
| 6,418,180 B1 | 7/2002 | Weiss | |
| 6,567,537 B1 | 5/2003 | Anderson | |
| 6,671,397 B1 * | 12/2003 | Mahon et al. | 382/145 |
| 7,123,750 B2 | 10/2006 | Lu et al. | |
| 7,765,882 B2 | 8/2010 | Greten et al. | |
| 7,859,674 B2 | 12/2010 | Greten et al. | |
| 7,998,669 B2 | 8/2011 | Deppermann et al. | |
| 8,028,469 B2 | 10/2011 | Deppermann et al. | |
| 8,073,235 B2 | 12/2011 | Hausmann et al. | |
| 8,189,901 B2 | 5/2012 | Modiano et al. | |
| 8,245,439 B2 | 8/2012 | Deppermann et al. | |
| 8,488,865 B2 | 7/2013 | Hausmann et al. | |
| 2003/0072484 A1 | 4/2003 | Kokko et al. | |
| 2003/0142852 A1 | 7/2003 | Lu et al. | |
| 2005/0074146 A1 | 4/2005 | Jones et al. | |
| 2006/0066048 A1 * | 3/2006 | Krenn | A63F 1/14 |
| | | | 273/149 R |
| 2006/0068372 A1 | 3/2006 | Jones, III | |
| 2009/0046890 A1 * | 2/2009 | Hausmann | G06T 7/0012 |
| | | | 382/100 |
| 2009/0125197 A1 | 5/2009 | Behnke | |
| 2010/0329515 A1 | 12/2010 | Edgerton et al. | |
| 2011/0041399 A1 | 2/2011 | Stachon et al. | |
| 2012/0228199 A1 | 9/2012 | Modiano et al. | |
| 2012/0288854 A1 | 11/2012 | Deppermann et al. | |
| 2013/0266191 A1 | 10/2013 | Hausmann et al. | |

FOREIGN PATENT DOCUMENTS

| | | |
|---|---|---|
| CN | 101957313 A | 9/2010 |
| CN | 201010288152 A | 1/2011 |
| EP | 1053671 | 11/2000 |
| JP | 04145309 | 5/1992 |
| JP | 2006-34257 | 2/2006 |
| JP | 04273416 B2 | 6/2009 |
| WO | WO2006010761 A1 | 2/2006 |
| WO | WO2009023110 A1 | 2/2009 |

OTHER PUBLICATIONS

PCT/US2008/009433 International Search Report.
Jia, J., "Seed maize quality inspection with machine vision", SPIE-Computer Vision for Industry, vol. 2989 (288-295) 1993. Abstract XP002507235.
Pesaresi, Martino et al., "A New Approach for the Morphological Segmentation of High-Resolution Satellite Imagery", IEEE Transactions on Geoscience and Remote Sensing, IEE Service Center, Pisctaway, NJ, US, vol. 39(2), Feb. 1, 2001.
Shyu, Chi-Ren et al., Image Analysis for Mapping Immeasurable Phenotypes in Maize [Life Sciences]:, IEEE Signal Processing Magazine, IEEE Service Center, NJ, US, vol. 24(3): 115-118 (May 2, 2007). Abstract ZP011201393, ISSH: 1053-5888.
Key Technology, Product Literature.
EPO Exam Report, Issued Dec. 3, 2014, Application #12 708 070.3-1706.
U.S. Appl. No. 60/778,830; filed Mar. 2, 2006; first name inventor: Deppermann.
U.S. Appl. No. 60/940,788; filed May 30, 2007; first name inventor: Deppermann.

* cited by examiner

SYSTEM AND METHOD FOR PRESENTATION OF EARS OF CORN FOR IMAGE ACQUISITION AND EVALUATION

CROSS-REFERENCE TO RELATED APPLICATIONS

This application claims priority to U.S. Provisional Application No. 61/475,462, filed Apr. 14, 2011, which is hereby incorporated herein in its entirety by reference.

FIELD OF THE INVENTION

Various embodiments of the present invention relate generally to a system and method for image acquisition and evaluation for ears of corn. More specifically, embodiments of the present invention provide a system and method for high throughput presentation of ears of corn for image acquisition and evaluation.

BACKGROUND OF THE INVENTION

It is typical for a company in the agricultural seed industry to generate one or more research plots in order to evaluate certain seed varieties. Such seed varieties may include, but need not be limited to, seeds from a specific source, genotype, population, and/or breeding line that may or may not contain varying constructs or events of single or stacked transgenes. In such a manner, researchers may evaluate characteristics of the plants growing in the research plot, as well as characteristics of any crops produced from the plants. Examples of desirable traits include, but are not limited to, increased yield, increased homozygosity, improved or newly conferred resistance and/or tolerance to specific herbicides and/or pests and pathogens, increased oil content, altered starch content, agronomic traits pertaining to standability, nutraceutical composition, stress tolerance, and specific morphological based trait enhancements. In the context of ears of corn, increased kernel quantity, quality, size, and density on the ear of corn may all be desirable. In some instances these characteristics may be compared to plants grown from different seed varieties in the same research plot or a separate research plot.

Thus, certain experiments may require a researcher to record and evaluate the characteristics of crops grown from a variety of different genotypic backgrounds. Traditional research plot evaluation may be performed using an automated harvesting system (i.e. combine harvester). However, this technology may provide a uni-dimensional view of yield in as much as it may provide a single bulked weight of all grains harvested from that plot with no information on variation within the plot, no removal of alley-adjacent ears, and/or no quantification of ear flex and no information on yield component traits. As such, researchers may resort to manual evaluation of those traits, which may require significant time and labor in order to evaluate a statistically significant number of samples of ears of corn. Further, manual methods of evaluating sample crops may suffer from human error. In this regard, manually recording data relating the samples presents the opportunity for errors to occur. Further, it may be possible for the workers to lose track of which sample crops relate to which variety of seed. For example, in some instances sample crops from different seed varieties may appear substantially identical to the naked eye and thus may not be easily linked to the corresponding planted seed variety. Accordingly, known methods of collecting and evaluating crop samples may require significant manual labor and may produce erroneous labor due to the potential for human error to exist.

BRIEF SUMMARY

In one embodiment a system for automated high throughput presentation of an ear of corn for image acquisition and evaluation is provided. The ear staging system may comprise an image acquisition system for acquiring an image of the ear of corn and an ear staging system configured for coordinating timing and movement of the ear of corn through the image acquisition system. The ear staging system may include a singulation device configured for timing separated advancement of the ear of corn through the image acquisition system. Also, the ear staging system may include an orientation device configured for orienting the ear of corn for presentation at a desired attitude while passing through the image acquisition system.

In some embodiments the system for automated high throughput presentation of an ear of corn may include a sensory system configured for determining the presence or absence of the ear of corn for triggering one or more systems or actions. The sensory system may be configured to trigger an image sensor adapted to acquire the image of the ear of corn. The sensory system may include at least one of an electronic sensor, an electromechanical sensor, and a mechanical sensor. The system for automated high throughput presentation of an ear of corn may further comprise an onboard image storage and processing system adapted to store the image or a plurality of image data in a data store and/or adapted to apply one or more image processing algorithms to the image of the ear of corn for extracting the image data and adapted to extract interpreted data from the image data.

Further, in some embodiments the ear staging system may comprise an ear advancement device configured for advancing the ear of corn through the image acquisition system. Also, the ear staging system may comprise one or more conveyance paths having a confluence in ear delivering communication with the image acquisition system. The one or more conveyance paths may comprise an inlet in ear receiving communication with an ear husking system and an outlet in ear delivering communication with the image acquisition system.

Also, in some embodiments the system for automated high throughput presentation of an ear of corn may further comprise an ear husking system configured for revealing a plurality of morphological information about the ear of corn. The ear husking system may comprise an inlet for receiving the ear of corn and an outlet in ear delivering communication with the ear staging system. Further, the ear husking system may comprise a corn husking unit adapted to strip a husk and a plurality of silks from the ear of corn.

In some embodiments the system for automated high throughput presentation of an ear of corn may define a mobile structure and the system may further comprise an ear picking system for picking the ear of corn and an ear husking system for revealing one or more characteristics of the ear of corn. The ear picking system may comprise an ear picking row unit attached to a forward receiving end of the mobile structure. The ear picking row unit may comprise a stalk receiving end for passing over a row of corn and an ear delivering end for delivering the ear of corn to the ear husking system. The system for automated high throughput presentation of an ear of corn may further comprise a conveyor system disposed between the ear picking system and the ear husking system.

Additionally, the system for automated high throughput presentation of an ear of corn may include a post processing system comprising at least one of an ear disposal system for destroying and/or discarding ears of corn which are not collected and an ear collection and storage system configured for associating the ear of corn with the image. Associating the ear of corn with the image may comprise attaching an identifier label to the ear of corn associated with the image. Also, the system for automated high throughput presentation of an ear of corn may comprise a user interface and a controller for manual and/or automated operation of the ear picking system, the ear husking system, the ear staging system, and the image acquisition system.

In a further embodiment a method for automated high throughput presentation of a plurality of ears of corn for image acquisition and evaluation is provided. The method may comprise providing the ears of corn, coordinating timing and movement of the ears of corn through an image acquisition system using an ear staging system, and acquiring an image of each of the ears of corn using the image acquisition system. Additionally, the method may include singulating each of the ears of corn using the ear staging system for timing separated advancement of the ears of corn through the image acquisition system. The method may also include orienting each of the ears of corn for presentation at a desired attitude at the image acquisition system.

In some embodiments the method may further comprise sensing the presence and/or absence of the ears of corn at the ear staging system for controlling separated advancement of the ears of corn through the image acquisition system and at the image acquisition system for triggering an image sensor for acquiring an image of each of the ears of corn. Sensing the presence and/or absence of the ears of corn may comprise at least one of sensing with electronic sensors, sensing with electromechanical sensors, and sensing with mechanical sensors. Further, the method may include husking the ears of corn with an ear husking system for removing one or more materials to reveal characteristics of the ears of corn. The method may additionally comprise picking the ears of corn using a mobile structure that includes an ear picking system and an ear husking system.

Also, in some embodiments the method may further comprise conveying the ears of corn from the ear picking system to the ear husking system. The method may further comprise towing the mobile structure over a row of corn or driving the mobile structure over the row of corn. Additionally, the method may include picking a plurality of rows of corn and substantially simultaneously acquiring the image for each of the ears of corn which are picked from the rows of corn. The method may also include collecting and storing a plurality of image data for the ears of corn with the image acquisition system. Further, the method may comprise applying one or more image processing algorithms to the image for generating a plurality of image data and extracting and analyzing a plurality of interpreted data from the image data. The method may additionally include at least one of destroying and/or disposing of one or more uncollected ears of corn and collecting and associating the ears of corn with the image.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
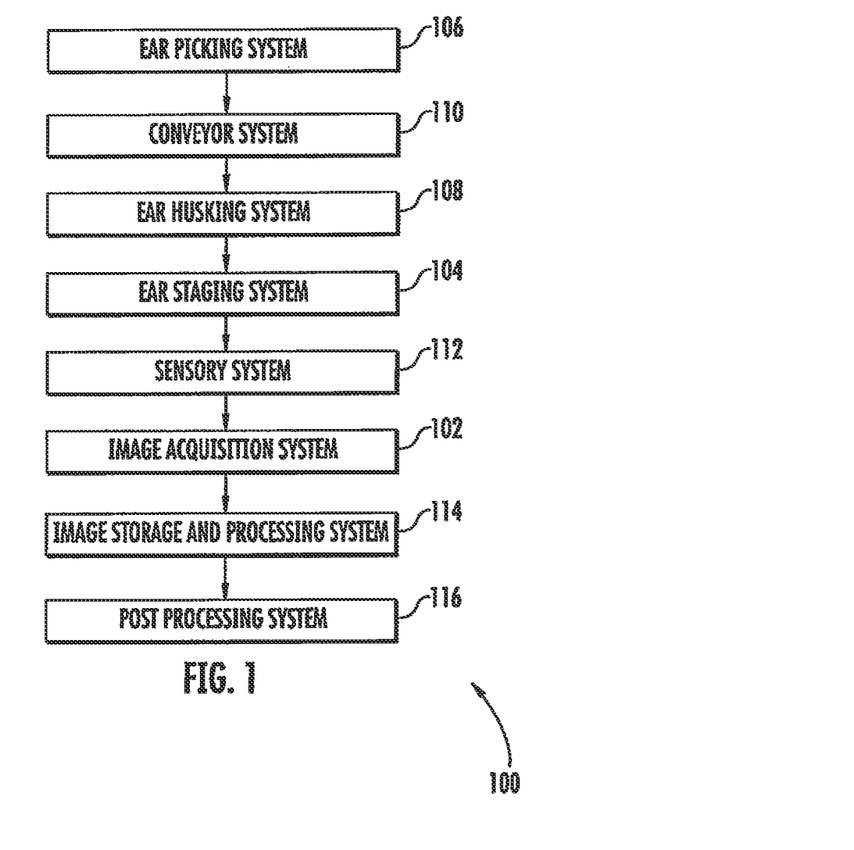
FIG. 1 illustrates a block diagram of an embodiment of a system for automated high throughput presentation of an ear of corn for image acquisition and evaluation in accordance with an example embodiment of the present invention.

A block diagram of one embodiment of a system 100 for automated high throughput presentation of an ear of corn for image acquisition and evaluation (i.e. the "ear evaluation system") is illustrated in FIG. 1. An embodiment of the ear evaluation system 100 will be described broadly with reference to FIG. 1, followed by description of an example embodiment of the ear evaluation system which defines a mobile structure. The ear evaluation system 100 may be configured to provide a multi-dimensional view of yield by providing more information than a single bulked weight of all grains harvested from a plot, as may be provided by present combine harvesters.

In one embodiment the ear evaluation system 100 may comprise an image acquisition system 102 and an ear staging system 104. The image acquisition system 102 may be configured to acquire one or more images of each ear of corn provided thereto. An image, as used herein, may refer to a photograph, frame from a video, and/or other representation of the ears of corn. In order to assist the image acquisition system 102, the ear staging system 104 may be configured to coordinate timing and movement of the ears of corn through the image acquisition system. One of ordinary skill in the art will appreciate that any number of methods can be used to move the ears through the image acquisition system 102. In one embodiment of the ear staging system 104, gravity may facilitate movement of ears through the image acquisition system 102. An alternate embodiment (not shown) may use a conveyor to facilitate movement of ears of corn through the image acquisition system 102. The image acquisition system 102 may comprise one or multiple image acquisition systems (not shown).

However, in some embodiments the ear evaluation system 100 may comprise additional systems. For example, in the illustrated embodiment the ear evaluation system 100 further comprises an ear picking system 106. The ear picking system 106 may be configured to pick the ears of corn, for example, by separating each ear of corn from a shank and the remainder of the vegetative matter associated with each corn plant. Further, the presentation system 100 may comprise an ear husking system 108 configured to reveal one or more characteristics of the ears of corn which are picked. Additionally, a conveyor system 110 may be disposed between the ear picking system 106 and the ear husking system 108 and thereby configured to provide the picked ears of corn to the ear husking system.

The ear evaluation system 100 may also comprise a sensory system 112. The sensory system 112 may be configured to determine the presence or absence of the ears of corn for triggering one or more systems or actions. In this regard, the sensory system 112 may be embodied at various other parts of the ear evaluation system, such as the ear staging system 104 and the image acquisition system 102 in some embodiments. The ear evaluation system 100 may further comprise an image storage and processing system 114 adapted to store the images taken of the ears of corn and/or store a plurality of image data. The image storage and processing system 114 may additionally or alternatively be adapted to apply one or more image processing algorithms to the image of the ear of corn for extracting the image data and adapted to extract the interpreted data from the image data. Additionally, a post processing system 116 may be configured to collect and store ears of corn and associate them with the corresponding images. Alternatively or additionally, the post processing system 116 may discard and/or destroy ears of corn which are not collected.

Figure 2:
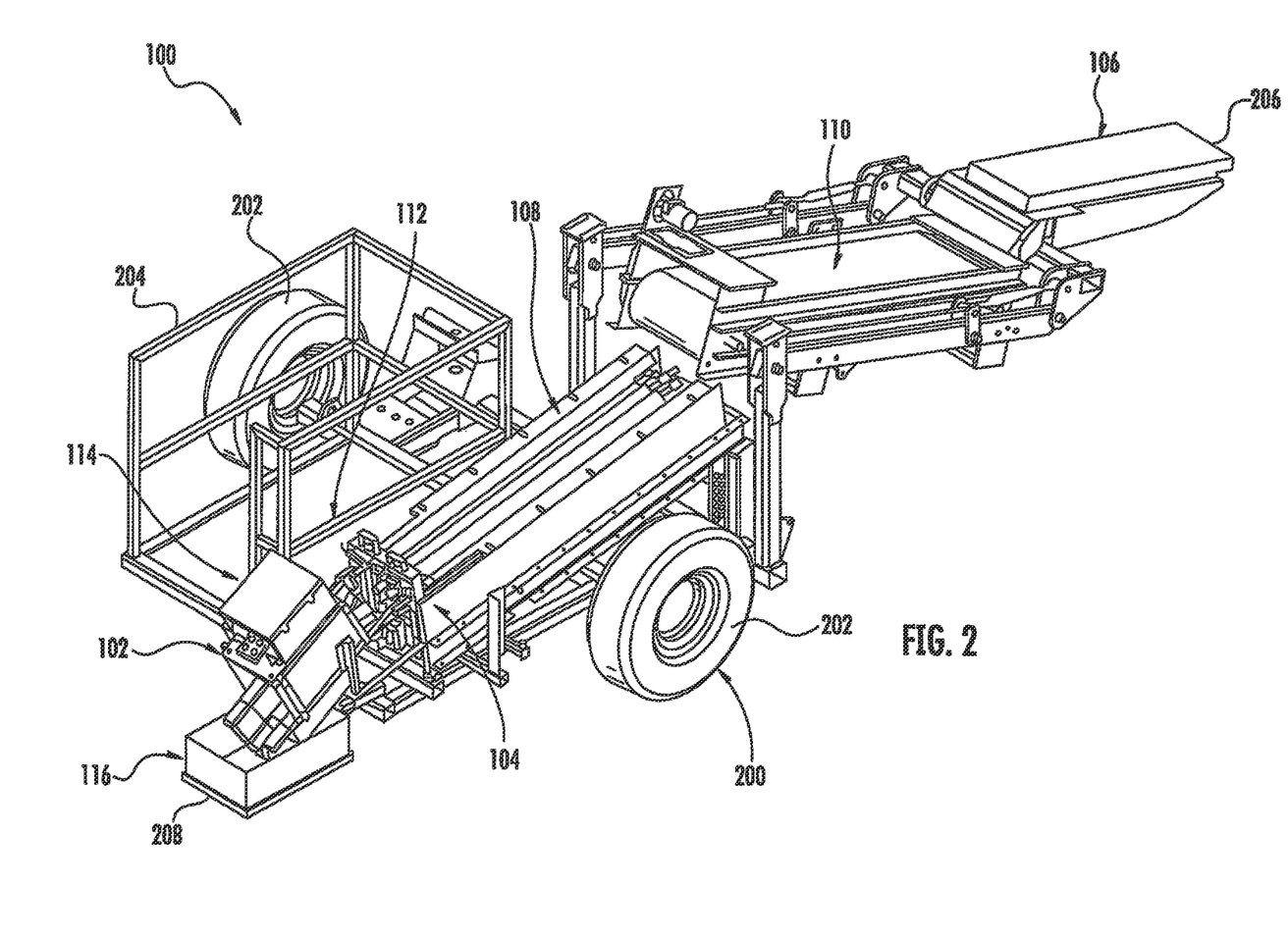
FIG. 2 illustrates a perspective view of an example embodiment of the ear evaluation system wherein the ear evaluation system defines a mobile structure in accordance with an example embodiment of the present invention.
Figure 3:
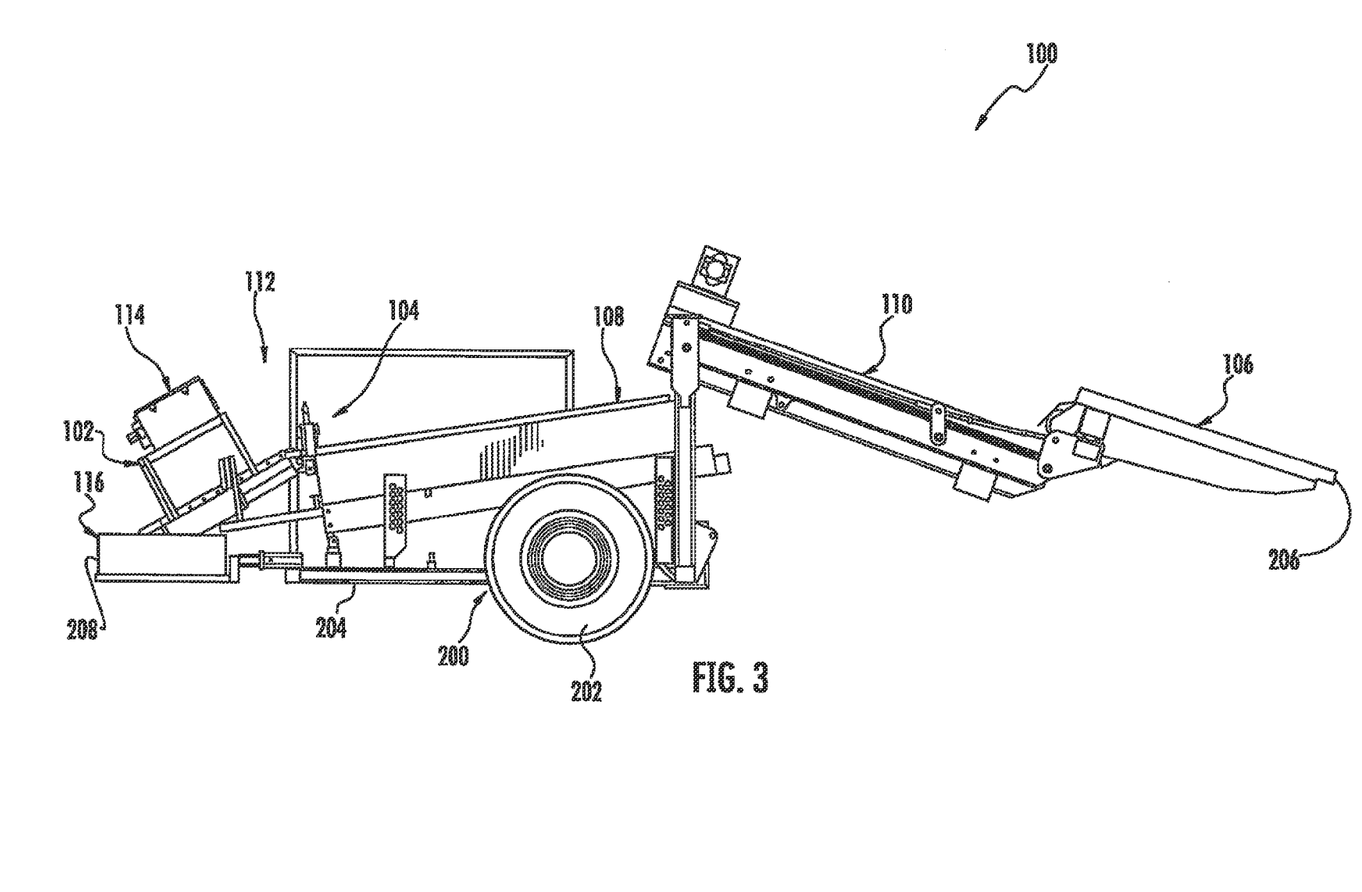
FIG. 3 illustrates a side view of the mobile structure of FIG. 2 in accordance with an example embodiment of the present invention.

Accordingly, embodiments of the ear evaluation system 100 may comprise some or all of the systems 102-116 described above. Further, the ear evaluation system 100 may take a number of forms in various embodiments. By way of example, FIGS. 2 and 3 illustrate an embodiment of the ear evaluation system 100 wherein the ear evaluation system defines a mobile structure 200. The mobile structure 200 may be towed or driven over rows of corn in various embodiments. Accordingly, the mobile structure 200 may comprise wheels 202 or other components such as skis and tracks which cause or facilitate movement of the mobile structure. Additionally, a frame 204 may support an operator and/or the various components of the ear evaluation system 100. Thereby, in some embodiments, the mobile structure 200 may substantially simultaneously pick rows of corn and acquire and evaluate images for each of the ears of corn which are picked from the rows of corn.

In this regard, when the ear evaluation system 100 defines the mobile structure 200, the ear evaluation system may include some or all of the systems 102-116 described above. For example, in the illustrated embodiment the ear evaluation system 100 comprises the image acquisition system 102 and the ear staging system 104. Further, the illustrated embodiment of the ear evaluation system 100 comprises the sensory system 112 which may be embodied at one or both of the ear staging system 104 and the image acquisition system 102.

Additionally, the ear evaluation system 100 may comprise the ear picking system 106 at a forward receiving end 206 of the mobile structure 200. The ear husking system 108 may receive ears of corn picked by the ear picking system 106 and delivered thereto by the conveyor system 110. At a reward end 208 of the mobile structure 200, the ear evaluation system 100 may include the post processing system 116. Further, ear evaluation system 100 may include the image storage and processing system 114, which may, for example, be positioned near the image acquisition system 102. Accordingly, some or all of the ear evaluation system 100 may be embodied on the mobile structure 200.

Figure 4:
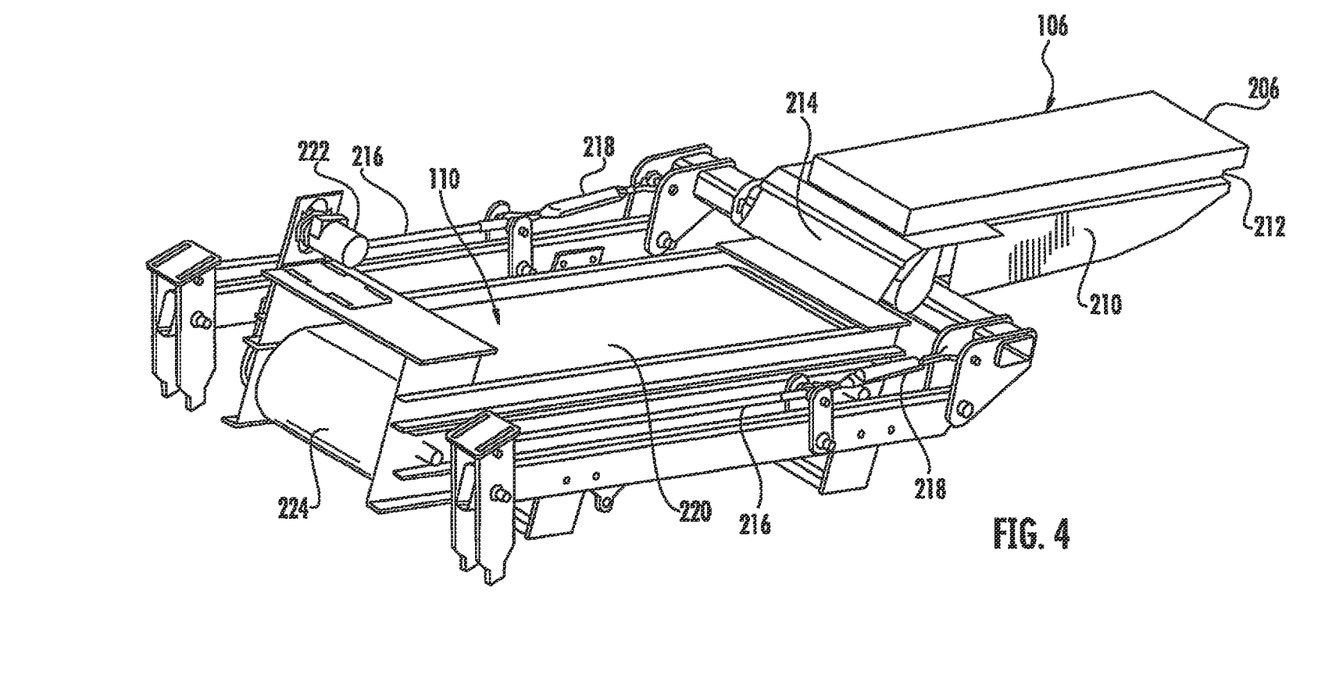
FIG. 4 illustrates an ear picking system and a conveyor system of the mobile structure of FIG. 2 in accordance with an example embodiment of the present invention.

With further regard to details of the ear evaluation system 100 wherein the ear evaluation system defines the mobile structure 200, FIG. 4 illustrates an enlarged view of the ear picking system 106 positioned at the forward receiving end 206 of the mobile structure. The ear picking system 106 is generally shown in outline without details because various embodiments of ear picking systems may be employed by the ear evaluation system. However, the ear picking system 106 may generally comprise an ear picking row unit 210 attached to the forward receiving end 206 of the mobile structure 200. For example, the mobile structure 200 may comprise an ear picking row unit manufactured by OXBO™ International Corporation.

The ear picking row unit 210 may comprise a stalk receiving end 212 generally located at the forward receiving end 206 of the mobile structure 200 and an ear delivering end 214 for delivering the picked ears of corn to the ear husking system 108. The ear picking row unit 210 may be configured to cut stalks above the ground, pull ears of corn from the stalks, and deliver the ears of corn to the conveyor system 110. In particular, the ear picking row unit 210 may include snapping rolls that cut the stalks and pull them down such that the ears of corn strike a set of stripper plates, which knock the ears of corn from the respective stalks. Further, gathering belts or chains may pull the ears of corn up the sloped stripper plates and out the ear delivering end 214 thereby transferring the ears of corn to the conveyor system 110.

The height of the ear picking row unit 210 with respect to the ground may be adjustable in some embodiments in order to cut the stalks at a desired height. For example, the height of the ear picking row unit 210 may be adjusted so that a head of the ear picking row unit is immediately below the ears of corn on the stalks to optimize picking success and minimize damage to the ears of corn. In this regard, the ear picking system 106 may further comprise a parallel linkage 216 which surrounds the conveyor system 110. The parallel linkage 216 may be adjustable by a pair of threaded adjusters 218 or mechanisms which retract or extend so as to adjust the angle of the ear picking row unit 210 with respect to the ground. Accordingly, the threaded adjusters 218 may be adjusted so as to maintain the ear picking row unit 210 at a slight angle with the ground regardless of the height selected for the ear picking row unit with respect to the ground.

After the ears of corn are removed from the stalks and deposited at the conveyor system 110, the ears of corn may still have one or more materials attached thereto, such as husk and silk material. Accordingly, the conveyor system 110 may be configured to deliver the ears of corn to the husking system 108. In this regard, the conveyor system 110 may comprise a conveyor belt 220 that includes cleats configured to engage the ears of corn. Thereby when a motor 222 advances the conveyor belt 220, the ears of corn travel with the conveyor belt and then fall off of the conveyor belt at the terminal end 224 of the conveyor belt.

Figure 5:
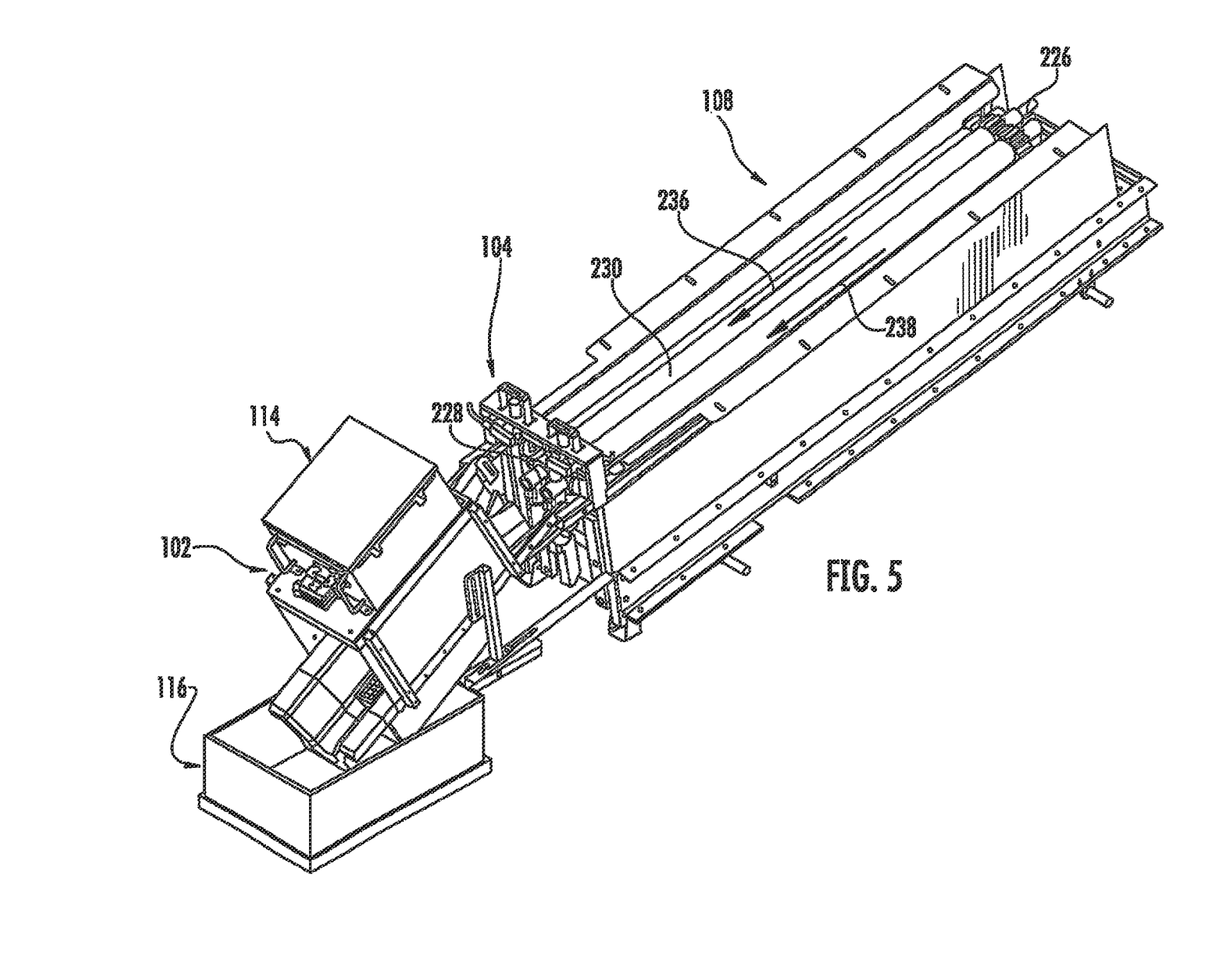
FIG. 5 illustrates an ear husking system, ear staging system, image acquisition system, image storage and processing system, and post processing system of the mobile structure of FIG. 2 in accordance with an example embodiment of the present invention.

Thus, the ears of corn arrive at the ear husking system 108 after falling off the conveyor belt 220. As illustrated in FIG. 5, the ear husking system 108 may slope generally downward from an inlet 226 for receiving ears of corn and an outlet 228 in ear delivering communication with the ear staging system 104. Ear delivering communication, as used herein, refers to an arrangement in which a system (or apparatus, etc.) is configured to deliver ears of corn to another system (or apparatus, etc.). Conversely, ear receiving communication, as used herein, refers to an arrangement in which a system (or apparatus, etc.) is configured to receive ears of corn from another system (or apparatus, etc.). The ear husking system 108 may comprise a corn husking unit 230 which is adapted to strip a husk and a plurality of silks from each ear of corn as the ears of corn travel from the inlet 226 to the outlet 228. Thereby, the ear husking system 108 may reveal a plurality of morphological information about the ears of corn by removing outer material and exposing kernels.

Figure 6:
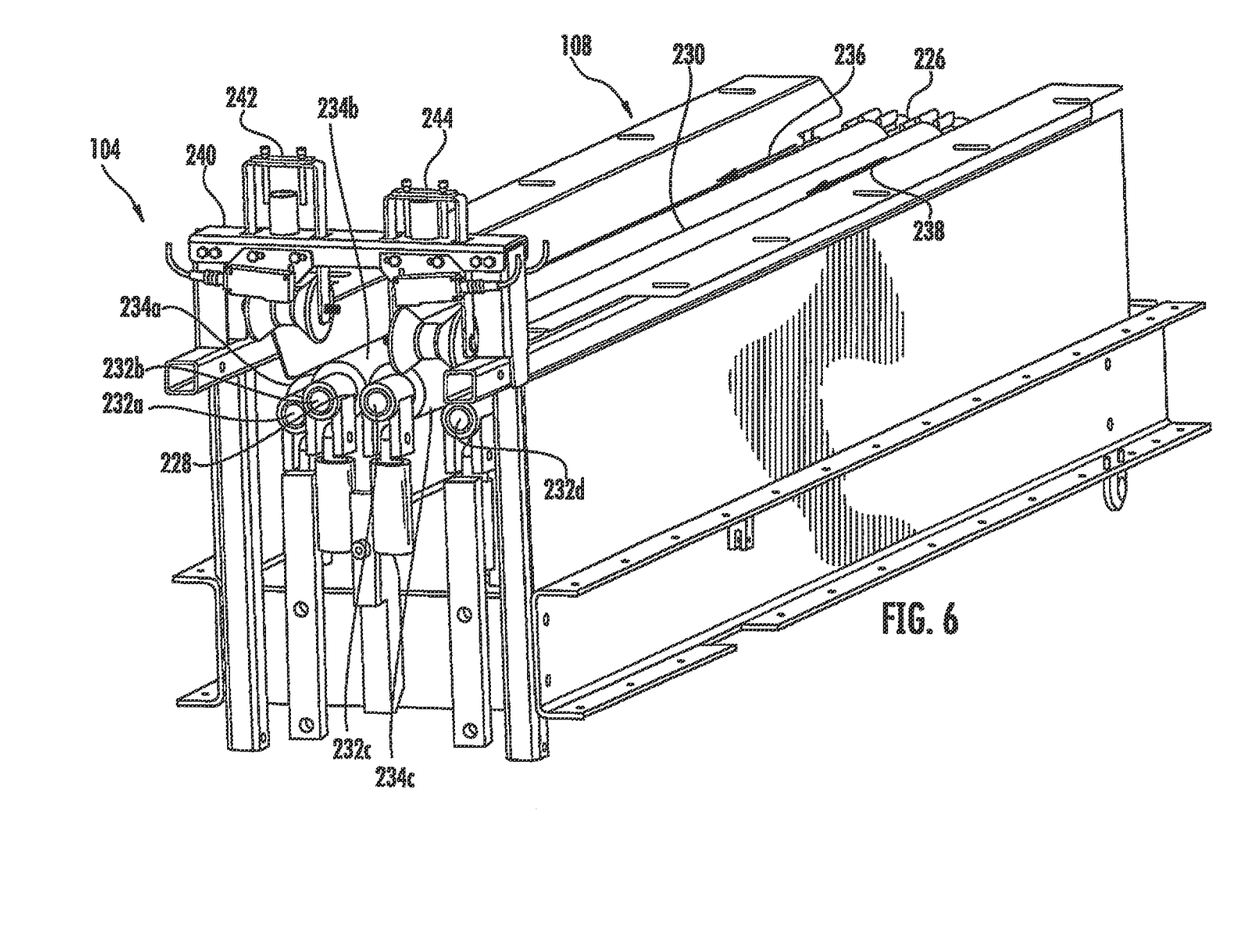
FIG. 6 illustrates an enlarged view of the ear husking system and ear staging system of the mobile structure of FIG. 5 in accordance with an example embodiment of the present invention.

As illustrated in FIG. 6, the ear husking unit 230 may comprise a plurality of parallel shafts 232 which may each be encased by a respective spiral rubber roller 234. Pairs of the parallel shafts 232 may rotate in opposite directions such that the upper surfaces of the spiral rubber rollers 234 rotate generally toward each other. In the illustrated embodiment a first pair of shafts 232a, 232b form a first lane 236 along which a first portion of the ears of corn travel and a second pair of shafts 232c, 232d form a second lane 238 along which a second portion of the ears of corn travel. As the pairs of shafts 232 rotate toward each other, the spiral rubber rollers 234 pull the husk and silks off of each ear of corn. While material is being removed from the ears of corn, the ears of corn travel along the respective lanes 236, 238 toward the outlet 228 of the ear husking system 108. This movement occurs due to the influence of gravity as caused by the sloped arrangement of the ear husking unit 230 as well as spiral grooves and/or protrusions formed on the spiral rubber rollers 234. Accordingly, ears of corn which enter the ear husking system 108 at the inlet 226 may reach the outlet 228 substantially free of husk and silk material.

When the ears of corn reach the outlet 228 of the ear husking system 108, the ears of corn may arrive at the ear staging system 104. In particular, the ears of corn may be directed to a singulation device 240, which may comprise a portion of the ear staging system 104. The singulation device 240 may be configured for timing advancement of ears of corn through the image acquisition system 102. As illustrated in FIG. 6, the ears of corn advancing through the ear husking system 108 along the lanes 236, 238 may encounter respective ear advancement devices 242, 244 at the ear staging system 104.

Figure 7:
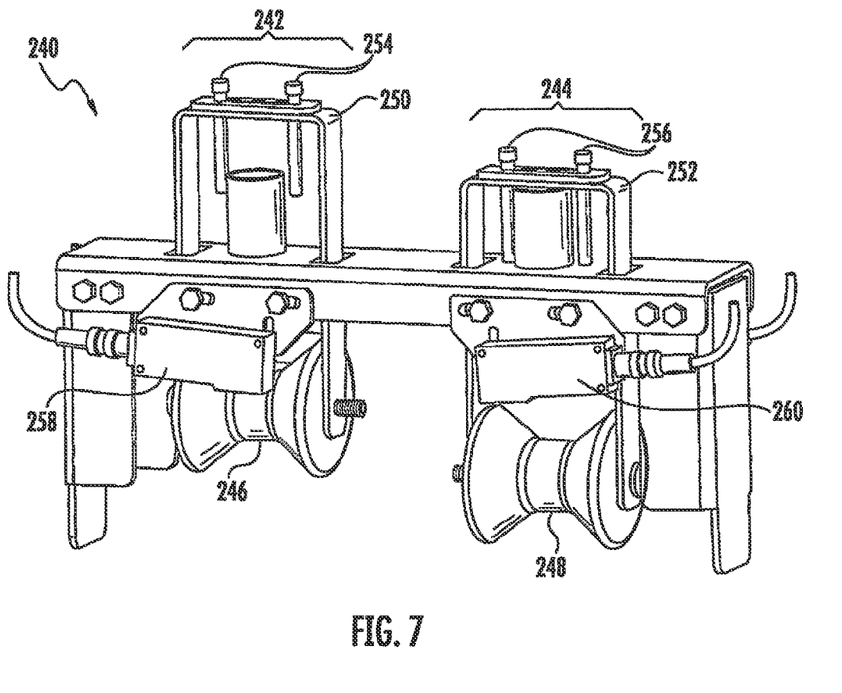
FIG. 7 illustrates an enlarged view of a singulation device of the ear staging system of FIG. 6 in accordance with an example embodiment of the present invention.

FIG. 7 illustrates an enlarged view of the singulation device 240 including the ear advancement devices 242, 244. The advancement devices 242, 244 may respectively comprise v-shaped rollers 246, 248 which are mounted to spring-loaded brackets 250, 252. The spring-loaded brackets 250, 252 may be configured so as to press the v-shaped rollers 246, 248 downwardly on ears of corn passing through the singulation device 240. In particular, the spring-loaded brackets 250, 252 may press the v-shaped rollers 246, 248 downwardly so as to cause ears of corn received from the lanes 236, 238 to engage respective motorized rollers (not shown). The motorized rollers may comprise a rubberized material or comprise other grip-enhancing features which assist the motorized rollers in imparting motion to the ears of corn. Stop bolts 254, 256 may limit the downward travel of the spring-loaded brackets 250, 252 such that the ears of corn may more easily enter the respective spaces between the v-shaped rollers 246, 248 and the motorized rollers. As an addition or alternative to the ear singulation device shown in FIG. 7, a conveyor (not shown) could be used to extract the ears of corn from the outlet 228 of the ear husking system. The conveyor could comprise an adjustable speed belt which could be configured to transport the corn at a speed of travel greater than the speed of travel within lanes 236 and 238 of the ear husking unit 230. The difference in speed would accelerate ears from the outlet 228 of the husking system through the ear imaging system 102. Space between the sequential ears of corn could be adjusted by increasing or decreasing the speed of the adjustable speed conveyor belt (not shown).

As mentioned above, a portion of the sensory system 112 may be embodied at the ear staging system 104. In this regard, a plurality of sensors may be included at the singulation device 240. In one embodiment the sensors may include upstream sensors mounted generally upstream of the v-shaped rollers 246, 248, and downstream sensors 258, 260 mounted generally downstream of the v-shaped rollers in terms of the movement of the ears of corn through the ear evaluation system 100. The sensors may be configured to detect the presence or absence of the ears of corn at their respective locations. For example, the sensors may comprise proximity sensors in some embodiments. However, various types of sensors may be employed which may, for example, comprise electronic sensors, electromechanical sensors, and/or mechanical sensors.

In one embodiment the motorized rollers may be controlled based on the presence or absence of the ears of corn at the ear advancement devices 242, 244 as detected by the downstream sensors 258, 260 and the upstream sensors. For example, in one embodiment the motorized rollers may be controlled such that they normally do not rotate and thereby the ears of corn are stopped by the rollers unless the motorized rollers are activated. In this regard, when the ears of corn are detected by one or both of the upstream sensors, the singulation device 240 may turn on one of the motorized rollers so as to cause the detected ears of corn to travel through and eject from the singulation device. The downstream sensors 258, 260 may detect the presence of the ear of corn while it passes through the ear advancement device 242, 244. For example, the motorized roller may be directed to continue to rotate until the downstream sensor 258, 260 no longer detects presence of the ear of corn. Accordingly, at this point the motorized roller may be directed to turn off again.

Figure 8:
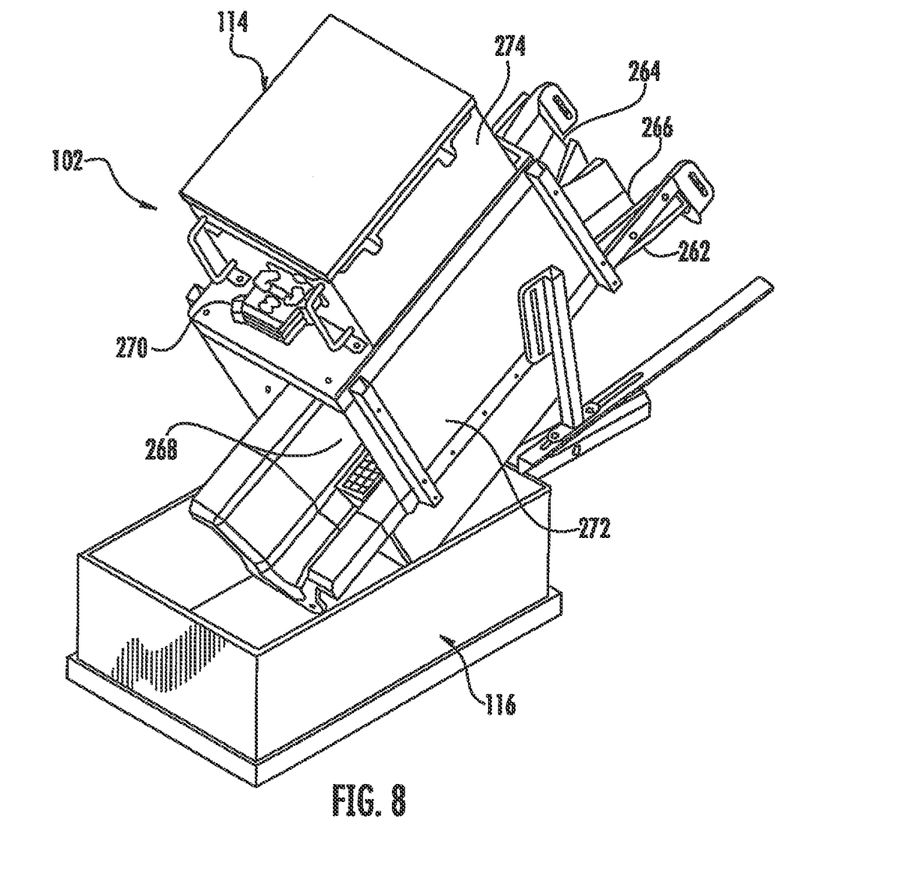
FIG. 8 illustrates an enlarged view of the image acquisition system, image storage and processing system, and post processing system of FIG. 5 in accordance with an example embodiment of the present invention.

The above-described operation may occur for both ear advancement devices 242, 244 at staggered intervals in order to separately advance each ear of corn through the image acquisition system 102. In this regard, the ears of corn may be ejected from the singulation device 240 into one or more conveyance paths having a confluence in ear delivering communication with the image acquisition system 102. For example, FIG. 8 illustrates a chute 262 which defines conveyance paths leading to the image acquisition system 102. In particular, the chute 262 defines inlets 264, 266 which are respectively in ear receiving communication with the lanes 236, 238 of the ear husking system 108 after the ears of corn are ejected by the singulation device 240. The chute 262 further defines an outlet 268 in ear delivering communication with the image acquisition system 102.

Thus, the chute 262 may generally define a "Y-shape." The chute 262 may also act as an orientation device configured to orient the ears of corn for presentation at a desired attitude while passing through the image acquisition system 102. For example, in the illustrated embodiment the chute 262 is downward sloped and causes the ears of corn to align such that they travel generally along their major axis as they pass through the image acquisition system 102. One of ordinary skill would appreciate that, in alternative embodiments, in place of the chute 262, an adjustable speed conveyor belt (not shown) may be configured to provide one or more lane of travel on the belt. The conveyor belt (not shown) may combine the ears from the ear husking lanes 236, 238 into one lane which transports the ears to the image acquisition system 102. One of ordinary skill in the art would also appreciate that the conveyance paths 264, 266 need not form a 'Y' shape, and alternate embodiments (not shown) may utilize more than one lane to transport ears to more than one image acquisition system 102. 230. The adjustable speed conveyor belt (not shown) may comprise, but is not limited to, flat or shaped belts. The adjustable speed conveyor belt may also be combined with guides (not shown) for orienting the ears along their major axis as they pass through the image acquisition system 102.

As indicated above, a portion of the sensory system 112 may be embodied at the image acquisition system 102. In this regard, one or more sensors may be used to detect the presence or absence of the ears of corn as they travel through the chute 262. or other embodiments (not pictured). For example, in another embodiment (not pictured), one or more sensors may be used to detect the presence and absence of ears of corn and they travel on the one or more lanes provided on an adjustable conveyor belt. Also, for example, the sensors may comprise electronic sensors, electromechanical sensors, and/or or mechanical sensors in various embodiments. In one embodiment the sensory system 112 is configured to trigger an image sensor, such as a camera 270, adapted to acquire an image of the ear of corn after a sensor upstream of the camera determines that the ear of corn is present and then absent. However, various other data acquiring devices may acquire other data relating to the ear of corn. Further, the particular sensor placement and corresponding control logic may vary as may be understood by one having skill in the art. The image acquisition system 102 may further comprise a light shield 272 configured to block ambient light and a light (not shown) within the light shield configured to illuminate the ears of corn such that the camera may capture consistent images and/or other data.

As described above, the ear evaluation system 100 may further comprise an image storage and processing system 114. As illustrated in FIG. 8, in some embodiments the image storage and processing system 114 may be positioned onboard the mobile structure 200, for example, in a housing 274 in which the camera 270 is retained. Thereby, the image data may be stored and/or processed as described above.

The image storage and processing system 114 may name the image with a desired descriptor relating to information such as the plot location, plant location, identification number, experiment, and/or a genetic description of the ear of corn. Further, the image storage and processing system 114 may process the image data or other acquired data using a variety of techniques. For example, the image storage and processing system 114 may process the data using background filtering to remove extraneous data relating to the environment around the ear of corn. Further, the image storage and processing system 114 may conduct kernel separation processing which may, for example, be used to determine the size and/or quantity of the kernels on the ear of corn. Additionally, the image storage and processing system 114 may apply masking techniques to determine kernels per ear and kernel area, yield, ear measurements, scattergrain, and tip kernel abortion. However, various other types and forms of processing may be conducted by the image storage and processing system 114 depending on the type of data acquired.

After the ears of corn exit the image acquisition system 102, the ears of corn may be directed to the post processing system 116. As described above, the post processing system 116 may include an ear disposal system for destroying and/or discarding ears of corn which are not collected and/or an ear collection and storage system configured for associating the ears of corn with the respective images thereof. With regard to associating the ears of corn with the respective images thereof, in some embodiments this may involve attaching an identifier label, such as a radio-frequency identification ("RFID") tag or a barcode label, to the respective ear of corn associated with the image. In some embodiments the ears of corn may be disposed of by immediately directing the ears of corn into a grinder or the ears of corn may be directed into a bulk wagon using a conveyor for disposal at a later time. However, in the embodiment illustrated in FIG. 8, the ears of corn fall into a tub 276 where they are stored.

It should be noted that some or all of the above-described systems 102-116 may be controlled by a user interface and/or a controller. In some embodiments the user interface and/or the controller may be embodied on the mobile structure 200. Further, the user interface and the controller may provide for manual and/or automated operation of some or all of the systems 102-116 described above.

Figure 9:
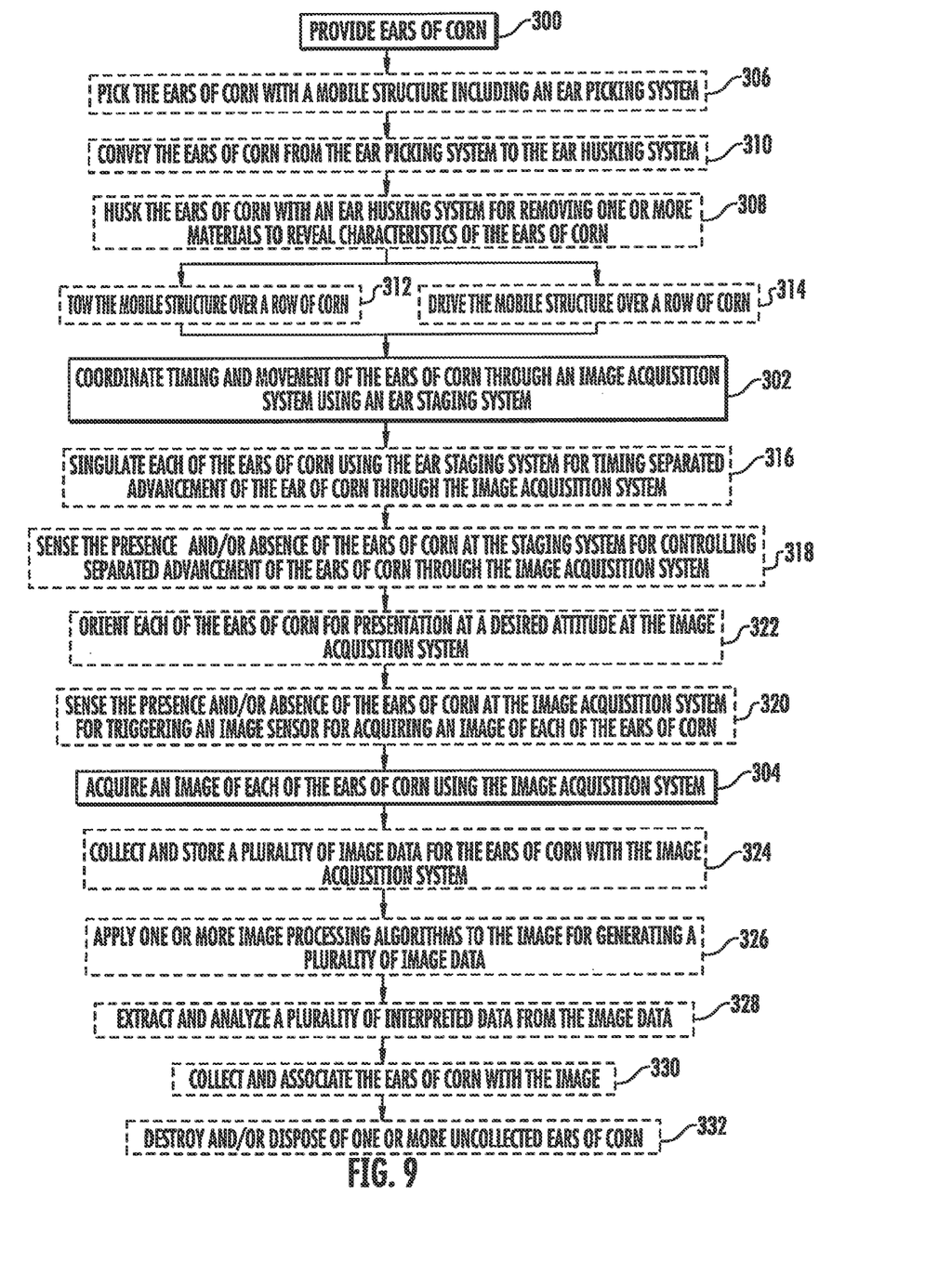
FIG. 9 illustrates a method for high throughput presentation of a plurality of ears of corn for image acquisition and evaluation in accordance with an example embodiment of the present invention.

Accordingly, embodiments of the ear evaluation system 100 as described above may provide for high throughput image acquisition and evaluation. Further, embodiments of related methods are also provided herein. In this regard, FIG. 9 illustrates an embodiment of a method for automated high throughput presentation of a plurality of ears of corn for image acquisition and evaluation. As illustrated, the method may comprise providing the ears of corn at operation 300. Further, the method may include coordinating timing and movement of the ears of corn through an image acquisition system using an ear staging system at operation 302. Additionally, the method may include acquiring an image of each of the ears of corn using the image acquisition system at operation 304. Thus, some embodiments of the method may include picking a plurality of rows of corn and substantially simultaneously acquiring the image for each of the ears of corn which are picked from the rows of corn.

In some embodiments the method may additionally or alternatively comprise other operations including those operations illustrated in dashed lines in FIG. 9. For example, the method may further comprise picking the ears of corn using a mobile structure that includes an ear picking system at operation 306. The method may also comprise husking the ears of corn with an ear husking system for removing one or more materials to reveal characteristics of the ears of corn at operation 308. In some embodiments the ear husking system may comprise part of the mobile structure. Further, the method may comprise conveying the ears of corn from the picking system to the ears husking system at operation 310. Additionally, the method may comprise either towing the mobile structure over a row of corn at operation 312 or driving the mobile structure over the row of corn at operation 314.

The method may further comprise singulating each of the ears of corn using the ear staging system for timing separated advancement of the ears of corn through the image acquisition system at operation 316. Also, the method may include sensing the presence and/or absence of the ears of corn at the ear staging system for controlling separated advance of the ears of corn through the image acquisition system, as indicated at operation 318 and at the image acquisition system for triggering an image sensor for acquiring an image of each of the ears of corn at operation 320. Sensing the presence and/or absence of the ears of corn may comprise sensing with electronic sensors, sensing with electromechanical sensors, and/or sensing with mechanical sensors in various embodiments. Additionally, the method may comprise orienting each of the ears of corn for presentation at a desired attitude at the image acquisition system at operation 322.

Further, the method may include collecting and storing a plurality of image data for the ears of corn with the image acquisition system at operation 324. The method may additionally comprise applying one or more image processing algorithms to the image for generating a plurality of image data at operation 326 and extracting and analyzing a plurality of interpreted data from the image data at operation 328. The method may also include collecting and associating the ears of corn with the image at operation 330. Additionally, the method may comprise destroying and/or disposing of one or more uncollected ears of corn at operation 332. Accordingly, various embodiments of methods for automated high throughput presentation of ears of corn for image acquisition and evaluation are provided.

Many modifications and other embodiments of the invention set forth herein will come to mind to one skilled in the art to which these invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile system for automated high throughput presentation of an ear of corn for image acquisition and evaluation, comprising:
   a mobile ear husking unit adapted to strip a husk and a plurality of silks from the ear of corn, said ear husking system comprising a downwardly sloped lane formed by two parallel rollers and connected to
   an ear staging system configured for coordinating timing and movement of the ear of corn through an image acquisition system, wherein said ear staging system comprises a singulation device configured for timing separated advancement of the husked ear of corn through the image acquisition system and an outlet in ear delivering communication with a mobile image acquisition system for acquiring an image of the ear of corn, wherein the image is used to determine at least one of kernels per ear, kernel area, ear size, scattergrain or tip kernel abortion; and
   a post processing system comprising at least one of:
   a. an ear disposal system for destroying and/or discarding ears of corn which are not collected; and
   b. an ear collection and storage system configured for associating the ear of corn with the image.

2. The system according to claim 1 wherein the ear staging system further comprises an orientation device configured for orienting the ear of corn for presentation at a desired attitude while passing through the image acquisition system.

3. The system according to claim 1 further comprising a sensory system configured for determining the presence or absence of the ear of corn for triggering one or more systems or actions.

4. The system according to claim 3 wherein the sensory system is configured to trigger an image sensor adapted to acquire the image of the ear of corn.

5. The system according to claim 4 wherein the sensory system comprises at least one of:
   a. an electronic sensor;
   b. an electromechanical sensor; and
   c. a mechanical sensor.

6. The system according to claim 1 further comprising an onboard image storage and processing system:
   a. adapted to store the image or a plurality of image data in a data store; and/or
   b. adapted to apply one or more image processing algorithms to the image of the ear of corn for extracting the image data and adapted to extract interpreted data from the image data.

7. The system according to claim 1 wherein the ear staging system comprises an ear advancement device configured for advancing the ear of corn through the image acquisition system.

8. The system according to claim 1 wherein the ear staging system comprises one or more conveyance paths having a confluence in ear delivering communication with the image acquisition system.

9. The system according to claim 8 wherein the one or more conveyance paths comprise:
   a. an inlet in ear receiving communication with an ear husking system; and
   b. an outlet in ear delivering communication with the image acquisition system.

10. The system according to claim 1 wherein the system comprises:
    a. an ear picking system for picking the ear of corn; and
    b. an ear husking system for revealing one or more characteristics of the ear of corn.

11. The system according to claim 10 wherein the ear picking system comprises an ear picking row unit attached to a forward receiving end of the mobile structure.

12. The system according to claim 11 wherein the ear picking row unit comprises:
    a. a stalk receiving end for passing over a row of corn; and
    b. an ear delivering end for delivering the ear of corn to the ear husking system.

13. The system according to claim 10 further comprising a conveyor system disposed between the ear picking system and the ear husking system.

14. The system according to claim 1 wherein associating the ear of corn with the image comprises attaching an identifier label to the ear of corn associated with the image.

15. The system according to claim 10 further comprising a user interface and a controller for manual and/or automated operation of:
    a. the ear picking system;
    b. the ear husking system;
    c. the ear staging system; and
    d. the image acquisition system.

16. A method for automated high throughput presentation of a plurality of ears of corn for image acquisition and evaluation, comprising:
provided the ears of corn;
stripping a husk and a plurality of silks from each of the ears of corn using a mobile ear husking unit comprising a lane formed by two parallel rollers and sloped in a generally downward direction;
coordinating timing and movement of the ears of corn through a mobile image acquisition system using an ear staging system, wherein the ear staging system comprises singulating each of the ears for timing separated advancement of the husked ears using a sensing device to detect the presence and/or absence of the ear of corn, and an outlet in ear delivering communication with the mobile image acquisition system;
delivering a singulated husked ear to the image acquisition system;
acquiring an image of the singulated husked ear of corn using an image sensor of the image acquisition system, wherein the image is used to determine at least one of kernels per ear, kernel area, ear size, scattergrain or tip kernel abortion; and
destroying or disposing of one or more uncollected ears of corn or collecting and associating one or more ears of corn with the image.

17. The method according to claim 16 further comprising orienting each of the ears of corn for presentation at a desired attitude at the image acquisition system.

18. The method according to claim 16 wherein sensing the presence and/or absence of the ears of corn comprises at least one of:
a. sensing with electronic sensors;
b. sensing with electromechanical sensors; and
c. sensing with mechanical sensors.

19. The method according to claim 16 further comprising picking the ears of corn using a mobile structure that includes an ear picking system and an ear husking system.

20. The method according to claim 19 further comprising conveying the ears of corn from the ear picking system to the ear husking system.

21. The method according to claim 19 further comprising:
a. towing the mobile structure over a row of corn; or
b. driving the mobile structure over the row of corn.

22. The method according to claim 16 further comprising picking a plurality of rows of corn and substantially simultaneously acquiring the image for each of the ears of corn which are picked from the rows of corn.

23. The method according to claim 16 further comprising collecting and storing a plurality of image data for the ears of corn with the image acquisition system.

24. The method according to claim 16 further comprising:
a. applying one or more image processing algorithms to the image for generating a plurality of image data; and
b. extracting and analyzing a plurality of interpreted data from the image data.

* * * * *